United States Patent
Barnett et al.

(10) Patent No.: US 10,830,675 B2
(45) Date of Patent: Nov. 10, 2020

(54) AUTOSTAINER HEMATOXYLIN AND METHODS OF USE

(71) Applicant: Ventana Medical Systems, Inc., Tucson, AZ (US)

(72) Inventors: Heidi Barnett, Tucson, AZ (US); Edward E. Durrant, Oro Valley, AZ (US); Eric L. Klein, Tucson, AZ (US); Michael Lynch, Tucson, AZ (US); Kevin H. Pritchard, Tucson, AZ (US)

(73) Assignee: Ventana Medical Systems, Inc., Oro Valley, AZ (US)

( * ) Notice: Subject to any disclaimer, the term of this patent is extended or adjusted under 35 U.S.C. 154(b) by 0 days.

(21) Appl. No.: 15/627,183

(22) Filed: Jun. 19, 2017

(65) Prior Publication Data

US 2017/0284908 A1    Oct. 5, 2017

Related U.S. Application Data

(63) Continuation of application No. PCT/EP2015/079928, filed on Dec. 16, 2015.

(60) Provisional application No. 62/093,894, filed on Dec. 18, 2014.

(51) Int. Cl.
  *G01N 1/30*  (2006.01)
  *G01N 21/25* (2006.01)
  *G01N 1/31*  (2006.01)

(52) U.S. Cl.
  CPC .............. *G01N 1/30* (2013.01); *G01N 1/312* (2013.01); *G01N 21/253* (2013.01); *G01N 2001/302* (2013.01)

(58) Field of Classification Search
  CPC . G01N 2001/302; G01N 1/312; G01N 21/253
  See application file for complete search history.

(56) References Cited

U.S. PATENT DOCUMENTS

| | | | |
|---|---|---|---|
| 8,551,731 B2 | 10/2013 | Kosmeder et al. | |
| 2008/0227143 A1* | 9/2008 | Kosmeder | G01N 1/30 |
| | | | 435/40.52 |
| 2009/0246824 A1 | 10/2009 | Wiederhold et al. | |

FOREIGN PATENT DOCUMENTS

| | | | |
|---|---|---|---|
| CN | 103694732 A | * | 4/2014 |
| CN | 103694732 A | | 4/2014 |
| GB | 673441 A | | 6/1952 |
| JP | 2014059282 A | * | 4/2014 |
| JP | 2014059282 A | | 4/2014 |
| WO | 2008112993 A1 | | 9/2008 |
| WO | 2009148885 A2 | | 12/2009 |

OTHER PUBLICATIONS

Wakamatsu, JP-2014059282-A, English translation of pub from Espacenet, downloaded in Feb. 2019 (Year: 2019).*
Liu, CN-103694732-A, English translation of pub from Gooogle, downloaded in Feb. 2019 (Year: 2019).*
International Search Report and Written Opinion dated Mar. 24, 2016 for corresponding PCT/EP2015/079928 filed Dec. 16, 2017, pp. 1-12.

* cited by examiner

*Primary Examiner* — Mark V Stevens
(74) *Attorney, Agent, or Firm* — Eric Grant Lee; Kellie L. Carden

(57) ABSTRACT

This disclosure relates to hematoxylin staining formulations and particularly to formulations for use in autostainers. The disclosed compositions were discovered to possess atypical stability under storage while having high stain quality and sufficiently fast staining performance. The disclosed hematoxylin staining compositions include a solvent system, hematoxylin, a chemical oxidant, and a mordant. Illustrative embodiments also have a $Cl^-/SO_4^-$ molar ratio of between about 2.5/1 and about 1/4.

33 Claims, 4 Drawing Sheets
(4 of 4 Drawing Sheet(s) Filed in Color)

AUTOSTAINER HEMATOXYLIN AND METHODS OF USE

CROSS-REFERENCE TO RELATED APPLICATIONS

This patent application is a continuation of International Patent Application No. PCT/EP2015/079928 filed Dec. 16, 2015, which claims priority to and the benefit of U.S. Provisional Application No. 62/093,894, filed Dec. 18, 2014. Each of the above patent application is incorporated herein by reference as if set forth in its entirety.

FIELD

The present invention relates to a composition and method for histochemical staining of biological samples. More particularly, the present invention relates to a hematoxylin formulation with enhanced stability against degradation.

BACKGROUND

Hematoxylin has been described as the most important and most used dye in histology, histochemistry, histopathology and cytology. Several histochemical staining protocols, including Hematoxylin and Eosin (H&E) staining and Papanicolaou (PAP) staining, rely on the dye hematoxylin to stain cytological and tissue samples. In particular, hematoxylin staining of cell nuclei is used by pathologists to detect the presence of malignant and/or metastatic cells in a tumor biopsy sample. Hematoxylin, also known as haematoxylin, natural black 1, or C.I. 75290m, is a naturally-occurring compound found in the red heartwood of trees of the genus Hematoxylon, e.g. the logwood tree. Hematoxylin is not the active ingredient that stains tissue components. Rather, an oxidation product of hematoxylin, hematein, becomes the active staining component of a hematoxylin dye solution, particularly upon complexation with a mordant. The hematein-mordant complex binds to compounds containing negative charges and stains them dark blue or violet which enables pathologists to visualize these negative-charge-containing structures within a biological sample.

Ehrlich's hematoxylin is a widely used formulation of hematoxylin as it is used to stain tissues shades of blue, pink and red. A formulation of Ehrlich's hematoxylin includes: 100 mL water. 100 mL ethanol (100%), 100 mL glycerol, 10 mL glacial acetic, acid, 2 g hematoxylin, and an excess, based on solubility, of aluminum potassium sulfate (alum; $AlK[SO_4]2.12H_2O$). To make Ehrlich's hematoxylin, the components are combined and allowed to ripen for approximately a month. Depending on the formulation, the ripening process, which involves exposure to air and sunlight, can take 3 or more months to provide a solution suitable for staining cells. This process can be highly variable and is typically not sufficiently reproducible for manufacturing hematoxylin for clinical autostainers.

In order to accelerate the conversion of hematoxylin to hematein, a chemical oxidant can be utilized. Unfortunately, the accelerated process often produces ineffective reaction products such as oxyhematein and complex polymeric precipitates, and also provides a solution that degrades faster than a naturally ripened dye solution. The exact amount of oxidant needed to quantitatively oxidize hematoxylin to hematein can be used to help avoid over-oxidation to ineffective products, but a partially-oxidized solution is more typically utilized when staining is not performed immediately. In a partially-oxidized solution, natural oxidation of the hematoxylin that is remaining after a chemical oxidation step will continue to replace any hematein that is either consumed during staining or is naturally oxidized further to ineffective products. Still, the concentration (and amount) of hematein can change over time.

Since hematein is the active staining component of a hematoxylin solution, changes in its concentration (and/or the concentration of its mordant complexes) over time leads to staining inconsistencies.

Hematoxylin has been known as a stain for tissues and cells for at least a century; however, formulations compatible with autostainers were only nascent discoveries. Manual staining typically involves dunking or dipping a slide-mounted sample into a vessel containing a hematoxylin formulation. A first advantage of this procedure is that large precipitates fall within the bottle so as to not be deposited on the slide. In a manual staining procedure, changes in hematein content of a hematoxylin solution can be compensated for by altering the contact time of a biological sample with the solution based on visual inspection. For example, an apparently under-stained sample can simply be placed back into the hematoxylin solution for a period of time to increase the staining intensity. In an automated staining procedure, however, "visual" inspection and extension of the exposure time in response to under-staining can require costly imaging equipment and can disrupt processing of other samples. Despite some practical advantages of manual hematoxylin staining, patient safety concerns, reproducibility, and speed/cost have driven a surge in the adoption of automated hematoxylin staining. The patient safety concern is that samples can and do lose adhesion to their slide within the staining bath. These foreign samples can then be transferred to a simultaneously or later stained slide potentially causing a misdiagnosis. A solution to this problem has been to provide a single-use staining reagent as a puddle on the slide surface so that cross-contamination is not possible. The on-slide approach requires a fundamentally different staining formulation as the delivery of the reagents to the slide via the autostainer uses instrument plumbing which must be kept clear of precipitates. Furthermore, the hematoxylin solution should have extended shelf-life for commercial implementation. Finally, for high-volume autostainers, the solution may only have 5 minutes or less, typically 2 minutes or less, to stain the sample. Thus, hematoxylin autostaining solutions have unique demands not met by formulations suitable for manual staining.

SUMMARY

The present disclosure describes a new hematoxylin staining composition and a more effective method of staining tissue using that composition. One aspect of the disclosure is that preventing precipitate in hematoxylin solutions while simultaneously improving long-term stain quality has remained an enduring challenge in the field despite many recent advances. Another aspect of the disclosure is that use of chemical additives or any ingredients that increase the stability of hematoxylin should be non-toxic, environmentally friendly, and of comparitively low cost. Accordingly, one aspect of the present disclosure are compositions devoid of toxic, environmentally harmful, and comparatively expensive ingredients. Instead of relying on chemical additives to slow the rate of precipitate formation, the present disclosure describes superior results from preparing hematoxylin solutions having defined counter-ion ratios. According to another aspect, sulfate as a counter-ion was believed to be a probable factor favoring precipitate formation and the inclusion of chloride as a counter-ion was discovered as a possible solution to the problem. In particular, it was discovered that particular chloride/sulfate ratios (i.e. $Cl^-/SO_4^{2-}$ molar ratios) were particularly advantageous as a staining formulation.

Aluminum sulfate has traditionally been used in nearly all hematoxylin formulations, most likely due to the fact that solutions prepared therefrom are excellent at producing intense nuclear staining in a relatively short periods of time. One aspect of the present disclosure is that while aluminum sulfate and aluminum chloride based hematoxylin solutions are known, the examples disclosed herein demonstrate that hematoxylin solutions prepared using solely aluminum chloride or solely aluminum sulfate are inferior to compositions which include ratios of the two. In particular, when aluminum chloride is used as a replacement to aluminum sulfate, the hematoxylin requires much more time to achieve similar staining characteristics compared to aluminum sulfate formulations. While these aluminum chloride solutions were discovered to be more resistant to forming precipitate, the staining characteristics were unacceptably slow. While not being limited to a particular theory, it is understood that the mechanism by which this effect is achieved is related to the greater binding affinity of chloride to aluminum compared to that of sulfate. It was discovered that the higher affinity (more covalent character or stronger) aluminum-chloride bond influences the hemalum hue in the same way as increasing the solution pH does for all hematoxylin solutions. It was also determined that stain hue is influenced by chloride content. More chloride drives stain hue towards blue from red. In sulfate only formulations, hematoxylin hue shift to red as pH drops (even across narrow pH ranges (e.g. 2.45-2.59). In other words, the hue of a chloride-based formulation at lower pH will be similar to that of a traditional sulfate solution at higher pH, and lower pH values favor hemalum solubility. It is understood that there is a 'blocking' effect of chloride, as shown in FIG. 1(C), which together with the increased proton concentration at the lower working pH values that the chloride permits, functions to interfere with interactions that otherwise occur between individual hemalum molecules, disfavoring precipitate. Unfortunately, while the presence of chloride (or the functional staining it permits at lower pH values) disrupts the formation of precipitate, it is also responsible for the lower rate of staining since it must also interferes with the desired interactions between hemalum and tissue.

Through careful experimentation, however, it was discovered that a combination of aluminum sulfate and aluminum chloride in hematoxylin formulations can produce solutions that stain as rapidly and intensely as sulfate solutions, but are far more resistant to precipitation. Furthermore, the examples show that stability enhancements provided by the chloride typically exceed the benefits imparted by the use of known chemical additives (e.g. host compounds and antioxidants). While these additives may still be included, their inclusion is not necessary when using the sulfate/chloride ratios disclosed herein. In yet another aspect, the present disclosure shows that non-toxic (or non-hazardous) propylene glycol can be used instead of ethylene glycol or ethanol (ingredients which some agencies classify as toxic/hazardous) in the presently described hematoxylin formulations.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
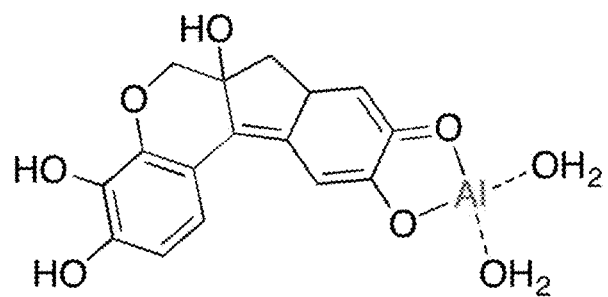
FIG. 1(A) is a chemical structure showing a hemalum complex with aluminum complexed by hematein and two aqua species as would be present for a hematoxylin solution in which $Al_2(SO_4)_3 \cdot nH_2O$ is used as a mordant.

I. Terms:

Unless defined otherwise, all technical and scientific terms used herein have the same meanings as commonly understood by one skilled in the art to which the disclosed invention pertains.

The singular forms "a," "an," and "the" include plural referents unless the context clearly indicates otherwise. Thus, for example, reference to "a host compound" refers to one or more host compounds, such as 2 or more host compounds, 3 or more host compounds, or even 4 or more host compounds.

The term "antioxidant" refers to an atom or molecule that has a greater oxidation potential than a second atom or molecule, such that the antioxidant is preferentially oxidized instead of the second atom or molecule. For example, an antioxidant can have a greater oxidation potential than hematein, and thus help prevent oxidation of hematein to oxyhematein. Furthermore, an antioxidant also can function as a reducing agent, for example, a reducing agent that converts oxyhematein back to hematein.

The term "aqueous solvent" refers to a composition having water as the major component and that is a liquid at room temperature. Mixtures of water and one or more lower alkanols or polyols that have 50% or greater water content by volume are examples of aqueous solvents. For example, solutions of ethylene glycol or propylene glycol and water are aqueous solvents.

The term "biological sample" refers to any sample that is obtained from or otherwise derived from a biological entity such as an animal, for example, a sample obtained from a human or a veterinary animal such as a dog, cat, horse or cow. Examples of biological samples include cytology samples, tissue samples and biological fluids. Non-limiting particular examples of biological samples include blood, urine, pre-ejaculate, nipple aspirates, semen, milk, sputum, mucus, pleural fluid, pelvic fluid, sinovial fluid, ascites fluid, body cavity washes, eye brushings, skin scrapings, a buccal swab, a vaginal swab, a pap smear, a rectal swab, an aspirate, a needle biopsy, a section of tissue obtained for example by surgery or autopsy, plasma, serum, spinal fluid, lymph fluid, sweat, tears, saliva, tumors, organs and samples obtained from in vitro cell or tissue cultures. Typically, the sample will be a biopsy sample that has been fixed, processed to remove water and embedded in paraffin or another suitable waxy substance for cutting into tissue sections. Biological samples can be mounted on substrates such as microscope slides for treatment and/or examination.

The term "hematoxylin composition", as used herein, generically refers both to compositions formed by dissolving hematein (the oxidation product of hematoxylin) directly into a solvent and to compositions formed by dissolving hematoxylin in a solvent and allowing or promoting oxidation of the hematoxylin to hematein. Although it is more typical to prepare the disclosed compositions by dissolving hematoxylin in a solvent and converting the hematoxylin to hematein (either completely or partially) by natural oxidation through contact with air or accelerated chemical oxidation, the benefits of the stabilizing effects of the disclosed composition components can also be utilized in combination with hematein compositions prepared by directly dissolving hematein in solvent. Thus, in some embodiments, a "hematoxylin composition" will include, at least initially, little or no hematoxylin and consist primarily of hematein. Molar concentrations of various components are disclosed herein. These concentrations are understood to reflect the concentration as formulated and when made. The concentrations of these ingredients will change over time according to various equilibrium-biased reactions. Accordingly, the concentrations may be described as formulated or made. This approach is understood to be the most clear and accurate manner to describe the solutions described herein due to the fact that they tend to ripen over time.

The term "host compound" refers to an organic or inorganic molecule, complex or material having an inner cavity portion or groove portion, and more particularly, to a molecule having an inner cavity portion or groove portion that can accommodate at least a portion of a hematein or other dye molecule. Host compounds include polysaccharides such as amyloses, cyclodextrins and other cyclic or helical compounds containing a plurality of aldose rings, for example, compounds formed through 1,4 and 1,6 bonding of monosaccharides (such as glucose, fructose, and galactose) and disaccharides (such as saccharose, maltose, and lactose). Other host compounds include cryptands, cryptophanes, cavitands, crown ethers, dendrimers, nanotubes, calixarenes, valinomycins, and nigericins. In particular embodiments, a host compound can be a cyclodextrin or cyclodextrin derivative. U.S. Pat. No. 8,551,731, which is incorporated by reference in its entirety for disclosure related to stabilized hematoxylin solutions, extensively discloses host compounds and their use in stabilizing hematoxylin solutions. While the host compounds are effective at stabilizing hematoxylin solutions, they tend to be expensive and precipitation remains an issue. In the examples shown herein, the control compositions (designated as ANS Hematoxylin) were made according to the methods disclosed in U.S. Pat. No. 8,551,731 as they represent the best known automated hematoxylin formulations presently known.

Host compounds can include cyclodextrin derivatives, amylose derivatives, cryptand derivatives, cryptophane derivatives, cavitand derivatives, crown ether derivatives, dendrimer derivatives, nanotube derivatives, calixarene derivatives, valinomycin derivatives, and nigericin derivatives modified with one or more substituents. For example, host compounds include amylose derivatives and cyclodextrin derivatives, wherein one or more of the hydroxyl groups or the hydrogen atoms of the hydroxyl groups of their constituent aldose rings are replaced with substituents. Examples of substituents include acyl groups (such as acetyl groups), alkyl groups, aryl groups, tosyl groups, mesyl groups, amino groups (including primary, secondary, tertiary and quaternary amino groups), halo groups (—F, —Cl, —Br and —I), nitro groups, phosphorous-containing groups (such as phosphate and alkylphosphate groups), sulfur-containing groups (such as sulfate and sulfate ester groups), bridging groups, (that, for example, connect two or more hydroxyl positions on a cyclodextrin ring or connect two or more host compounds), aldehyde groups, ketone groups, oxime groups, carboxylic acid groups and their derivatives, carbonate and carbamate groups, silicon-containing groups, boron-containing groups, tin-containing groups, and hydroxyalkyl groups (such as hydroxyethyl groups and hydroxypropyl groups).

Particular examples of cyclodextrins include α-cyclodextrin, β-cyclodextrin, γ-cyclodextrin, and δ-cyclodextrin, and derivatives of each of these classes of cyclodextrins. Particular examples of cyclodextrin derivatives, include hydroxypropylated α-cyclodextrin, hydroxypropylated β-cyclodextrin, hydroxypropylated γ-cyclodextrin, hydroxyethylated α-cyclodextrin, hydroxyethylated β-cyclodextrin, hydroxyethylated γ-cyclodextrin, hydroxyisopropylated α-cyclodextrin, hydroxyisopropylated β-cyclodextrin, hydroxyisopropylated γ-cyclodextrin, carboxymethylated α-cyclodextrin, carboxymethylated β-cyclodextrin, carboxymethylated γ-cyclodextrin, carboxyethylated α-cyclodextrin, carboxyethylated β-cyclodextrin, carboxyethylated γ-cyclodextrin, octyl succinated-α-cyclodextrin, octyl succinated-β-cyclodextrin, octyl succinated-γ-cyclodextrin, acetylated-α-cyclodextrin, acetylated-β-cyclodextrin, acetylated-γ-cyclodextrin, sulfated-α-cyclodextrin, sulfated-β-cyclodextrin and sulfated-γ-cyclodextrin. Other particular examples of cyclodextrins derivatives include the following β-cyclodextrin derivatives: 2,3-dimethyl-6-aminomethyl-β-cyclodextrin, 6-Azido-β-cyclodextrin, 6-Bromo-β-cyclodextrin, 6A,6B-dibromo-β-cyclodextrin, 6A,6B-diiodo-β-cyclodextrin, 6-O-Maltosyl-β-cyclodextrin, 6-Iodo-β-cyclodextrin, 6-Tosyl-β-cyclodextrin, Peracetyl-maltosyl-β-cyclodextrin, 6-t-butyldimethylsilyl-β-cyclodextrin, 2,3-diacetyl-6-butyldimethylsilyl-β-cyclodextrin, 2,6-dibutyl-3-acetyl-β-cyclodextrin, 2,6-dibutyl-β-cyclodextrin, 2,6-t-butyl-dimethylsilyl-β-cyclodextrin, and 2,6-di-O-methyl-3-allyl-β-cyclodextrin. A variety of cyclodextrins and cyclodextrin derivatives can be obtained commercially, for example, from CTD, Inc. (High Springs, Fla.), or they can be synthesized according to procedures outlined in the scientific literature, for example, in "Synthesis of Chemically Modified Cyclodextrins," Croft and Bartsch, *Tetrahedron*, 39: 1417-1474, 1983.

The term "lower alkanol" refers to a compound having the formula R—OH, where R is an alkyl group having between 1 and 5 carbon atoms such as a methyl group, an ethyl group, an n-propyl group, an isopropyl group, an n-butyl group, a sec-butyl group, a t-butyl group, an n-pentyl group, an isopentyl group or a neopentyl group. Examples of lower alkanols include methanol, ethanol and isopropanol.

The term "oxidant" refers to an atom or molecule having a greater reduction potential than a second molecule, for example, a greater reduction potential than hematoxylin such that it will react with and oxidize hematoxylin to hematein. Oxidants include naturally occurring molecular oxygen in the atmosphere that diffuses to and oxidizes hematoxylin and a "chemical oxidant" that is actively combined with hematoxylin (typically in solution) to convert at least a portion of the hematoxylin to hematein. Examples of useful chemical oxidants include one or more of an iodate salt (such as sodium iodate and potassium iodate), mercuric oxide, a permanganate salt (such as potassium permanganate), a periodate salt (such as sodium periodate and potassium periodate), and a peroxide (such as hydrogen peroxide). In particular embodiments, the chemical oxidant comprises sodium iodate.

The term "mordant" refers to an ionic metal species with which a dye (such as hematein) can form a complex (such as a cationic complex) that serves to bind the dye (such as hematein) to particular cellular components such as nuclear DNA, myelin, elastic and collagen fibers, muscle striations and mitochondria. Examples of mordants include aluminum (for example, in the form of an alum such as aluminum sulfate, aluminum potassium sulfate, aluminum ammonium sulfate, or aluminum chloride), iron, tungsten, zirconium, bismuth, molybdenum (phosphomolybdic acid or molybdic acid), vanadium (vanadate).

II. Overview

Figure 1B:
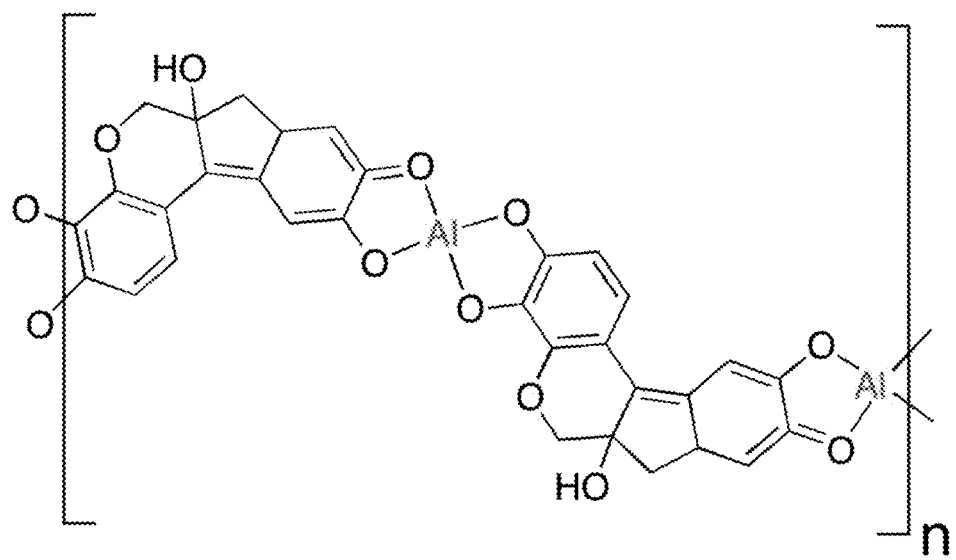
FIG. 1(B) is a chemical structure showing a hemalum oligomer showing a proposed structure for a hematoxylin precipitate in which multiple (n) hematein complexes form a chain where internal aluminum species are complexed by two hematein species.
Figure 1C:
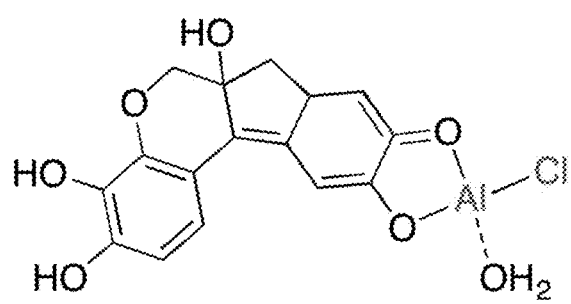
FIG. 1(C) is a hemalum complex with aluminum complexed by hematein, one aqua species, and one chloride species, as would be present for a hematoxylin solution in which $AlCl_3 \cdot 6H_2O$ is used, at least partially, as a mordant.

Solutions of aluminum hematoxylin are prone to degradation, forming increasingly significant amounts of precipitate over time that can be detected in solution or on slides as early as a few days after formulation preparation. FIG. 1(A) shows the structure of hemalum derived from an aluminum sulfate mordant in an acidic solution. The aluminum is complexed by hematein and water as shown. Shown in FIG. 1(B) is a proposed stucture of hemalum precipitate, which is composed of aggregates of hemalum, the positively charged dye species in its active, where n is an interger greater than 1. On stained tissue specimen slides, hematoxylin precipitate can exhibit a range of morphologies, ranging from discrete microcrystalline opaque spots that are 4-5 microns in diameter to opaque sheets that are in excess of 100 microns in diameter (e.g. evident wihout the aid of a microscope). The precipitate tends to collect on (i.e. associate with) negatively charged tissue components as shown in FIGS. 2(A)-2(F). Factors understood to increase the rate of precipitation include: pH values exceeding about 2.3, elevated temperatures, freeze/thaw cycles, temperature changes, high hemalum concentrations, and extended times. As such, maintaining a low pH, maintaining a stable temperature, and reducing the hematoxylin concentrations have been used to reduce the precipitation rate. Furthermore, chemical stabilization approaches were recently describe (See U.S. Pat. No. 8,551,731).

Figure 3A:
FIG. 3(A) is a photograph showing the precipitation of hematoxylin solutions on surfaces in which they contact. Two bottles (polyethylene terephthalate glycol-modified) that had previously contained hematoxylin at 45° C. for 32 days after the bottles had been drained and rinsed with deionized water (DI water), the left showing a bottle having contained the formulation as described in Example 1 and the right showing the bottle having contained the formulation of Example 4.
Figure 3B:
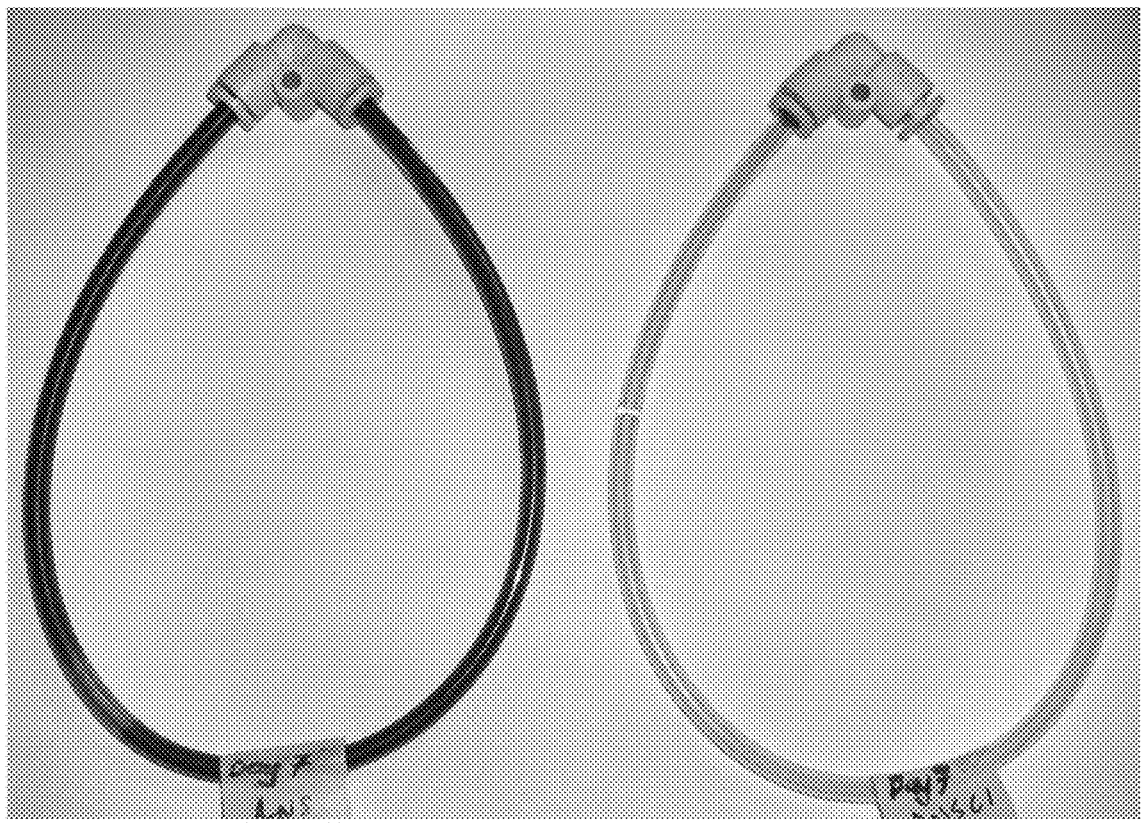
FIG. 3(B) is a photograph showing the precipitation of hematoxylin solutions on surfaces in which they contact. Loops of tubing, like that kind (e.g. perfluoroalkoxy resin (PFA)) which would be found in an autostainer, after containing solutions for 7 days at 60° C., were drained and rinsed with DI water. The left tubing contained the formulation as described in Example 1 and the right contained the formulation as described in Example 4.

In the solution itself, the precipitate tends to accumulate at interfaces, either the air/liquid interface, or the surface/container interface (e.g. on the surface of the bottle or tube). This can be seen in FIG. 3(A-B) are which are photographs showing the precipitation of hematoxylin solutions on surfaces in which they contact. FIG. 3(A) shows two bottles (polyethylene terephthalate glycol-modified) that had previously contained hematoxylin at 45° C. for 32 days after the bottles had been drained and rinsed with DI water, the left showing a bottle having contained the formulation as described in Example 1 and the right showing the bottle having contained the formulation of Example 4. FIG. 3(B) shows loops of tubing, like that kind (e.g. PFA) that would be found in an autostainer, after containing solutions for 7 days at 60° C., the loops were drained and rinsed with DI water, the left showing tubing having contained the formulation as described in Example 1 and the right showing the bottle having contained the formulation of Example 4. Hematoxylin solutions tend to precipitate on surfaces like product packaging, forming a coating, the coating appearing bronze-colored and/or as having a metallic sheen. The accumulation of precipitate eventually results in gross changes to the solution's appearance, and acceptable staining with these solutions becomes impractical. Dissolution and prevention of the precipitate is possible, for example by means of acidification or chelation, but these approaches cannot be applied to the dye solution directly since they also negatively impact the stain quality and diagnostic utility of the stain. For these reasons, when natural ripening cannot be used, hematoxylin solutions are typically prepared only as needed and are discarded soon after use.

In cases where greater solution lifetimes are required, such as on automated staining platforms, several methods have been developed to reduce the rate of precipitate formation while maintaining long-term staining characteristics. Most commonly, hematoxylin solutions can be prepared using a substoicheometric amount of oxidant (usually iodate). This results in less than the total possible amount of hemalum being formed initially, leaving unreacted dye precursor in solution. Slow 'ripening' (air oxidation) of the remaining hematoxylin to hematein, the component that actually binds aluminum to form hemalum dye, delays the formation and accumulation of precipitate since a lower concentration of hemalum exists in solution at any given time. The inclusion of antioxidants into the formulation (e.g. hydroquinone) can also delay the ripening process, offering further formulation stability with respect to precipitate formation. Less commonly, chemical additives such as beta-cyclodextrin can also be introduced to slow the rate of precipitate formation. The additives function by providing a reversible chemical pathway that competes kinetically with aggregation, thereby slowing the rate of precipitation. In the case of beta-cyclodextrin, hemalum molecules in solution form weak complexes with the additive, lowering the probability that the hemalum molecules will form complexes with each other. Unfortunately, the thermodynamically favored product (precipitate) will still eventually be obtained in the same quantities as without the additive, but the rates are reduced.

Innovations in Hematoxylin solutions have recently disclosed by Wadamatsu Kikuo in Published Japanese Patent Application JP2014059282. This publication, whose title can be translated as "Antimicrobial Hematoxylin Solution and Expanded Antimicrobial Hematoxylin Solution" discloses the preparation of hematoxylin solutions that are said to exhibit antimicrobial/anti-fungal properties. The disclosure of an antimicrobial hematoxylin is, in some manner, enigmatic as hematoxylin compositions are not widely understood to be susceptible to bacterium or fungi. The solution described contains: aluminum chloride hexahydrate, 5.0 g; hematoxylin, 1.5 g; sodium iodate, 0.3 g; ethanol, 30 mL; water, 870 mL; glycerol, 100 mL. With the exception of the presence of iodate and the relative amounts of ingredients, this formula strongly resembles Mayer's Mucihematein, a hematoxylin solution formulated for manual staining that uses aluminum chloride as a mordant. The other common aluminum-chloride-containing formulation is Rozas Iron Hematoxylin, which also contains ferric ammonium sulfate as a co-mordant.

The applicant references the Mayer formulation and specifically states that aluminum chloride was used since it dissolves more easily (quickly) than potassium aluminum sulfate (potassium alum), a typical aluminum mordant. While it is not clearly disclosed as to why this formulation is more microbe/fungus-resistant, it is understood to be from: (1) the large amount of iodate used (which is at the upper range of the amounts used in other formulations) and (2) the addition of iodate at the end of the formulation—after a large excess of Al(III) is already in solution, dropping the solution pH thereby increasing the oxidation potential of iodate. There is no suggestion that chloride is relevant to the microbial/fungal resistance. Rather, iodate is a known antiseptic and high concentrations would naturally result in better biocidal properties. As to the order of addition, as iodate ($IO_3^-$) oxidizes hematoxylin, iodide ($I^-$) is formed as the final product. Some of the iodide will be oxidized to elemental iodine ($I_2$) by remaining iodate. This process seems to be catalyzed by excess Al(III) in solution. For example, our own experiments showed that when iodate was added in the same order reported, noticeable amounts of iodine inevitably formed and were clearly observable in the vessel. As this is undesirable for our formulation, our process for manufacturing the hematoxylin prescribes the oxidation of hematoxylin before any aluminum is added.

Furthermore, JP2014059282 discloses that staining is slow with the chloride formulation and this is in complete agreement with our results. To combat this slow staining, JP2014059282 discloses combining solutions of aluminum chloride and aluminum sulfate prior to adding hematoxylin and iodate. This solution is referred to therein as "extended antibacterial hematoxylin solution" (EAHS). However, the disclosed composition still stains tissue too slowly for autostainer methods as disclosed herein. The disclosure also does not suggest $Cl^-/SO_4^{2-}$ molar ratios of between about 2.5/1 and about 1/2 are important to stability.

III. Hematoxylin Compositions

In illustrative embodiments, a hematoxylin staining composition includes a solvent, hematoxylin, an amount of a chemical oxidant sufficient to convert at least a portion of the hematoxylin to hematein, a mordant, wherein the composition has a chloride/sulfate ($Cl^-/SO_4^{2-}$) molar ratio of between about 2.5/1 and about 1/4. In illustrative embodiments, a hematoxylin composition includes a solvent, hematoxylin, an amount of a chemical oxidant sufficient to convert at least a portion of the hematoxylin to hematein, a mordant, wherein the composition further comprises $Cl^-$ and $SO_4^{2-}$, wherein the $Cl^-/SO_4^{2-}$ molar ratio is between about 2.5/1 and about 1/4. In one embodiment, the mordant comprises $Al_2(SO_4)_3$, $Al_2(SO_4)_3 \cdot 16H_2O$, $AlM(SO_4)_2 \cdot 12(H_2O)$, $Al_2(SO_4)_3 \cdot 6H_2O$, $Al_2(SO_4)_3 \cdot 18H_2O$, or $[Al(H_2O)_6]_2(SO_4)_3 \cdot 5H_2O$. wherein M is a monovalent cation. Non-limiting examples of monovalent cations include $Li^+$, $Na^+$, $K^+$, $Cs^+$, $NH_4^+$, etc.

In one embodiment, the mordant comprises $AlCl_3$ or $AlCl_3 \cdot 6H_2O$. In another embodiment, the mordant comprises $Al_2(SO_4)_3 \cdot 16H_2O$, $AlM(SO_4)_2 \cdot 12(H_2O)$, $Al_2(SO_4)_3 \cdot 6H_2O$, $Al_2(SO_4)_3 \cdot 18H_2O$, $[Al(H_2O)_6]_2(SO_4)_3 \cdot 5H_2O$, $AlCl_3$ or $AlCl_3 \cdot 6H_2O$ wherein M is a monovalent cation. In one embodiment, the composition has a $Cl^-/SO_4^{2-}$ molar ratio of between about 2/1 and about 1/2. In another embodiment, the composition has a $Cl^-/SO_4^{2-}$ molar ratio of between about 1.5/1 and about 1/1.5. In yet another embodiment, the composition has a $Cl^-/SO_4^{2-}$ molar ratio of about 1/1. In one embodiment, the chemical oxidant is sodium iodate.

In illustrative embodiments, a hematoxylin staining composition is made to a molar concentration of between about 0.01 M and about 0.05 M hematoxylin. In another embodiment, the composition is made to a molar concentration of between about 0.02 M and about 0.04 M hematoxylin. In yet another embodiment, the composition is made to a molar concentration of about 0.03 M hematoxylin. In another embodiment, the composition is made to a molar concentration of between about 0.001 M and about 0.01 M sodium iodate. In another embodiment, the composition is made to a molar concentration of between about 0.003 M and about 0.008 M sodium iodate. In one embodiment, the composition is made to a molar concentration of about 0.005M sodium iodate. In another embodiment, the composition is about 0.1M aluminum. In another embodiment, the composition is made to a molar concentration of about 0.1M aluminum. In yet another embodiment, the composition is made to a molar concentration of greater than about 0.1M aluminum. In another embodiment, the composition has an aluminum/hematoxylin molar ratio of between about 4/1 and about 1/1. In one embodiment, the composition has an aluminum/hematoxylin molar ratio of between about 3/1 and about 1.5/1. In another embodiment, the composition has an aluminum/hematoxylin molar ratio of about 2/1. In yet another embodiment, the composition is between about 0.01 M to about 0.1 M chloride. In one embodiment, the composition is between about 0.02 M to about 0.08 M chloride. In another embodiment, the composition is about 0.04 M chloride.

In illustrative embodiments, the hematoxylin in the hematoxylin staining composition has a molar concentration of between about 0.01 M and about 0.05 M. In another embodiment, the hematoxylin in the hematoxylin staining composition has a molar concentration of between about 0.02 M and about 0.04 M. In yet another embodiment, the hematoxylin in the hematoxylin staining composition has a molar concentration of about 0.03 M. In another embodiment, the composition comprises sodium iodate, wherein the sodium iodate has a molar concentration of between about 0.001 M and about 0.01 M. In another embodiment, the composition comprises sodium iodate, wherein the sodium iodate has a molar concentration of between about 0.003 M and about 0.008 M. In one embodiment, the composition comprises sodium iodate, wherein the sodium iodate has a molar concentration of about 0.005M. In another embodiment, the composition comprises aluminum, wherein aluminum has a molar concentration of about 0.1M. In yet another embodiment, the composition comprises aluminum, wherein aluminum has a molar concentration of greater than about 0.1M.

In another embodiment, the composition is made to a molar concentration between about 0.01 M to about 0.1 M chloride. In one embodiment, the composition is made to a molar concentration between about 0.02 M to about 0.08 M chloride. In another embodiment, the composition is made to a molar concentration to about 0.04 M chloride.

In another embodiment, the chloride in the hematoxylin staining composition has a molar concentration between about 0.01 M and about 0.1 M. In another embodiment the chloride in the hematoxylin staining composition has a molar concentration between about 0.02 M and about 0.08 M. In yet another embodiment, the chloride in the hematoxylin staining composition has a molar concentration of about 0.04 M.

In one embodiment, the composition is substantially devoid of a polysaccharide, a cryptand, a cryptophane, a cavitand, a crown ether, a dendrimer, a nanotube, a calixarene, a valinomycin, or a nigericin. In another embodiment, the composition is substantially devoid of an antioxidant. In one embodiment, the pH of the composition is between about 2 and about 2.7. In another embodiment, the pH of the composition is between about 2.2 and about 2.6.

IV. Methods of Making Hematoxylin Compositions

In illustrative embodiments, a method of making a hematoxylin formulation includes adding hematoxylin to a solvent; adding an amount of a chemical oxidant sufficient to convert at least a portion of the hematoxylin to hematein; adding a mordant and counter-ions wherein the formulation has a $Cl^-/SO_4^{2-}$ molar ratio of between about 2.5/1 and about 1/4. In one embodiment, the mordant comprises a mixture of $Al_2(SO_4)_3$, $Al_2(SO_4)_3.16H_2O$, $AlM(SO_4)_2.12(H_2O)$, $Al_2(SO_4)_3.6H_2O$, $Al_2(SO_4)_3.18H_2O$, $[Al(H_2O)_6]_2(SO_4)_3.5H_2O$, $AlCl_3$ or $AlCl_3.6H_2O$ wherein M is a monovalent cation.

The hematoxylin compositions described herein are made according to this general method:
1. Add/Dissolve hematoxylin in aqueous solution.
2. Add/Dissolve chemical oxidant.
3. Add/Dissolve mordant.
4. Modify $Cl^-/SO_4^{2-}$ molar ratio, if necessary
5. Add further additives, if necessary.

Accordingly, in an embodiment, a method of making a hematoxylin formulation includes adding hematoxylin to a solvent; adding an amount of a chemical oxidant sufficient to convert at least a portion of the hematoxylin to hematein; adding a mordant and counter-ions, and modifying the $Cl^-/SO_4^{2-}$ molar ratio to a molar ratio of between about 2.5/1 and about 1/4.

While disclosed in this order, particular steps can be done in different orders. For example, the hematoxylin could be prepared in a first solution and the remainder of components made in a second solutions. The final composition could then be prepared by combining the solutions. Furthermore, the mordant, oxidant, and further additives could be made in differing order with only minimum affect. The exception to this is the addition of the chemical oxidant to the hematoxylin. It appears, at least anecdotally, that the chemical oxidant should be added prior to the mordant according to some embodiments. Certain other components may be used to modify the $Cl^-/SO_4^{2-}$ molar ratio. For example, any chloride-containing salt may be used to modify the $Cl^-/SO_3^{2-}$ molar ratio (e.g. NaCl). Alternatively, an aluminum chlorosulfate, which is an aluminum salt with both sulfate and chloride anions may be used as a mordant and then salts could be used, if appropriate, to modify the $Cl^-/SO_4^{2-}$ molar ratio further. Another approach to obtaining the appropriate $Cl^-/SO_4^{2-}$ molar ratio is to use the chloride salts of any the ingredients in the formulation (e.g. example, using a hydrochloric acid salt of an ingredient instead of the usual free base).

In some cases, these strategies, using the compositions described herein, might offer stability benefits as well. In yet another approach, an acid having chloride counter-ions could be added to adjust both the $Cl^-/SO_4^{2-}$ molar ratio and the pH. However, the amount of chloride, which could be added using this approach, would be limited by restraints on the pH of the solution. In particular, the pH of the hematoxylin solution is beneficially between about 2 and about 2.7, or between about 2.2 and about 2.6.

V. Methods of Using Hematoxylin Compositions

In illustrative embodiments, a method for staining a biological sample with an autostainer includes contacting the biological sample with the hematoxylin composition described herein using the autostainer. In one embodiment, the method further comprises contacting the sample with a counterstain. In another embodiment, the counterstain is selected from the group consisting of eosin Y, orange G, light green SF yellowish, Bismark Brown, and fast green FCF. In another embodiment, the method includes contacting the sample with the hematoxylin composition comprises a progressive hematoxylin staining protocol. In another embodiment, contacting the sample with the hematoxylin composition comprises a regressive hematoxylin staining protocol. In yet another embodiment, the biological sample is supported on a substrate. In one embodiment, the substrate comprises a microscope slide. In another embodiment, the biological sample comprises a tissue section or a cytology sample. In one embodiment, the method comprises a hematoxylin and eosin (H&E) staining method. In another embodiment, the method comprises a Papanicolaou (PAP) staining method.

All staining was conducted using an automated staining instrument. The instrument was used for automated coverslipping and heated curing (92° C.). Tissue slides in all studies were 5-1 Symphony System Multi-Block Test Slides (P/N 1707100), which feature five different tissue types (liver, skin, kidney, tonsil, small intestine) mounted onto a single slide. Most studies used the simultaneous application of both a test and control formulation. The control formulation is described as ANS and is described in Example 1. Randomized pairs of consecutive tissue cuts were used in order to minimize variations in tissue morphology.

Various staining parameters were tested, but the most commonly used procedure for each study is described as the standard "mid"-level staining protocol H2A30E120D70, which features 2 minutes of hematoxylin incubation (H2), 30 seconds of acid wash (A30), 120 seconds of eosin incubation (E120) and 70 seconds of differentiation (D70). However, additional studies used standard "low"- and "high"-level staining protocols, H1A180E30D70 and H10A30E420D70, respectively, confirming that the Test formulations could adequately match ANS in terms of stain quality across all protocols. At least eight (but in most cases, sixteen) pairs of consecutively cut tissues treated with the test and control hematoxylin solutions were then presented to pathologists in a blinded format to assess the number and degree of differences, allowing statistical significance for any variations to be determined using Fisher's Exact Test.

Automated staining instruments now typically filter hematoxylin prior to depositing it onto the slide so as to produce slides with less non-specific signal. Another aspect of the procedures described herein, is that the primary hematoxylin filter was removed so that any precipitate in solution would be apparent on the slide. Accordingly, one aspect of the process for using the composition according to the present disclosure is to add an unfiltered composition to the sample. It was observed that the exemplary compositions disclosed herein, in particular Example 4, did not exhibit precipitate on slide like those as seen for the composition of Example 1. Furthermore, the hardware of the autostainer likewise remained free from obvious precipitate even after the composition had been stored and used in staining for more than six weeks of continuous use.

EXAMPLES

The following examples are provided to illustrate certain specific features of working embodiments and general protocols. The scope of the present invention is not limited to those features exemplified by the following examples.

Example 1

The ANS Hematoxylin Formulation is a based on the use of $Al_2(SO_4)_3 \cdot nH_2O$ as the mordant and has been specifically optimized for automated H&E staining using a Ventana SYMPHONY autostainer. The formulation is based on those disclosed in U.S. Pat. No. 8,551,731. This hematoxylin formulation was made according to the following formulation:

| ANS Hematoxylin Formulation (functional pH = 2.5) | |
|---|---|
| water | ~700 mL |
| ethylene glycol | 252.7 mL |
| hematoxylin | 6.06 g |
| sodium iodate | 0.65 g |
| $Al_2(SO_4)_3 \cdot 16H_2O$ | 26.67 g |
| hydroquinone | 9.32 g |
| β-cyclodextrin | 11.35 g |

Figure 2A:
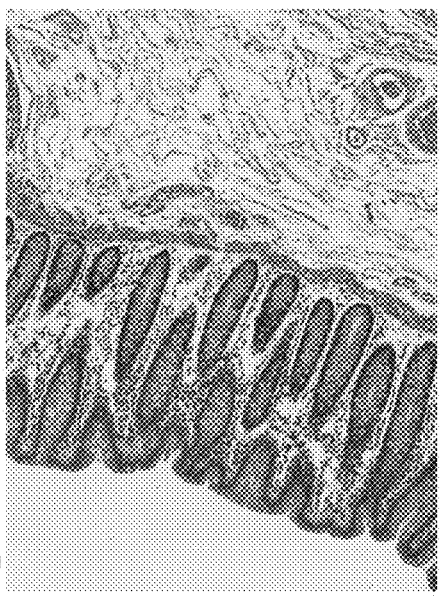
FIG. 2(A) is a photomicrograph of serial sections of 4 micron thick tissue sections taken at 10× magnification stained with the hematoxylin solution of Example 1 as it was freshly prepared.
Figure 2B:
FIG. 2(B) is a photomicrograph of serial sections of 4 micron thick tissue sections taken at 10× magnification stained with the hematoxylin solution of Example 4 as it was freshly prepared.
Figure 2C:
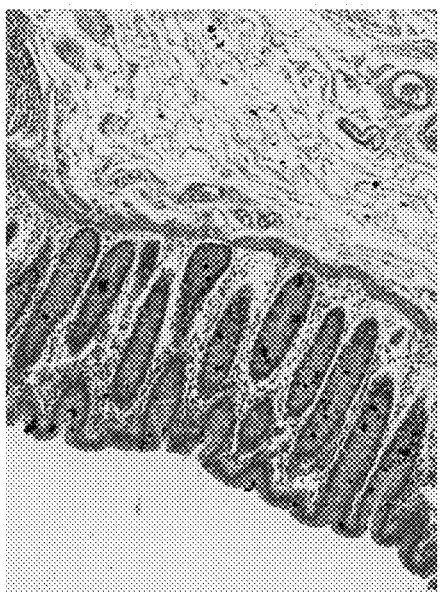
FIG. 2(C) is a photomicrograph of serial sections of 4 micron thick tissue sections taken at 10× magnification stained with the hematoxylin solution of Example 1 having undergone accelerated aging (45° C., 32 days) as described in Example 9.
Figure 2D:
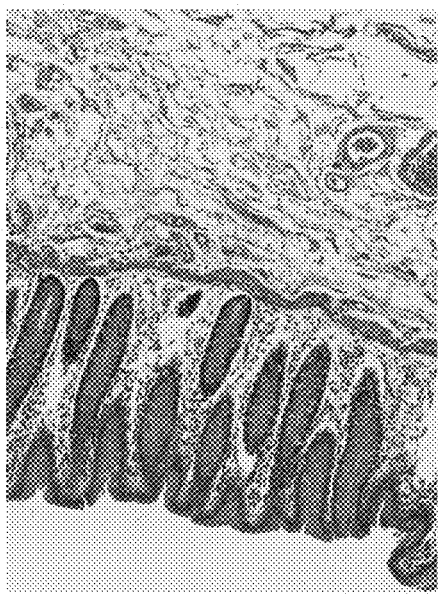
FIG. 2(D) is a photomicrograph of serial sections of 4 micron thick tissue sections taken at 10× magnification stained with the hematoxylin solution of Example 4 having undergone accelerated aging (45° C., 32 days) as described in Example 9.
Figure 2E:
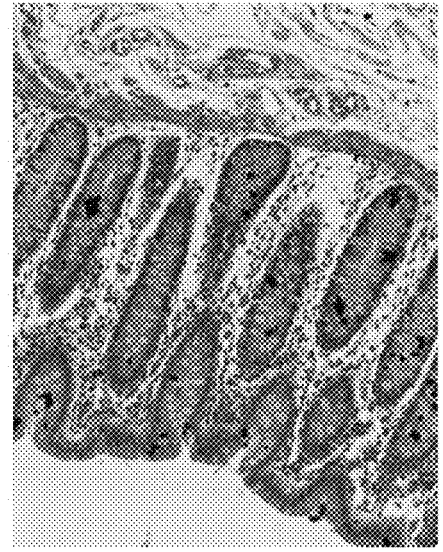
FIG. 2(E) is a photomicrograph of the same sections shown in FIG. 2(C) shown with a closer perspective (e.g. digital zoom).
Figure 2F:
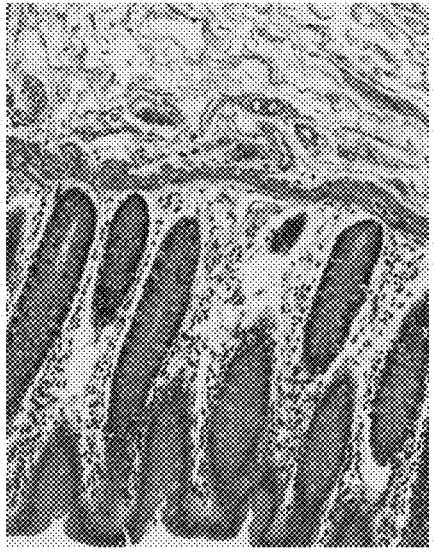
FIG. 2(F) is a photomicrograph of the same sections shown in FIG. 2(D) with a closer perspective (e.g. digital zoom).

The composition was made according to the following procedure:
1. Add/Dissolve hematoxylin in a solution of the water and ethylene glycol.
2. Add/Dissolve sodium iodate.
3. Add/Dissolve $Al_2(SO_4)_3 \cdot 16H_2O$
4. Add/Dissolve hydroquinone and β-cyclodextrin This composition was used as the benchmark for automated staining performance as it is the best known composition. This composition is capable of delivering appropriate staining on slide within approximately two minutes. While the composition stains well, has the correct hue and depth, and has sufficient long-term stability; it is not ideal in every sense. In particular, this composition precipitates over time and this impacts the lines of the staining instrument in a negative way. While this can be mitigated through appropriate maintenance and cleaning, the frequency and extent of maintenance and cleaning are thought to be too great. Furthermore, the precipitates may end up and show as apparent on the stained slide. While the precipitates are apparent, they do not create a scoring issue and thus are primarily a negative aspect of this composition from an aesthetic perspective. The addition of hydroquinone and β-cyclodextrin cause the composition to have a relatively high expense. Finally, the hydroquinone has been classified as a carcinogen in some jurisdictions. A typical staining using ANS Hematoxylin can be seen in FIG. 2(A). FIG. 2(A) was stained under the following protocol:

Functional staining was assessed on SYMPHONY "5-in-1" test slides, using unfiltered hematoxylin solutions.

Example 2

A hematoxylin formulation having a $Cl^-/SO_4^{2-}$ molar ratio of 1/0 (i.e. 100% $Cl^-$) was made. The same ingredients and concentrations were used as used in Example 1 except that $AlCl_3$ hexahydrate was used instead of $Al_2(SO_4)_3 \cdot 16H_2O$.

| ANS-Cl Hematoxylin Formulation (functional pH = 2.3) | |
|---|---|
| water | ~700 mL |
| ethylene glycol | 252.7 mL |
| hematoxylin | 6.06 g |
| sodium iodate | 0.65 g |
| $AlCl_3 \cdot 6H_2O$ | 20.43 g |
| hydroquinone | 9.32 g |
| β-cyclodextrin | 11.35 g |
| 4M NaOH | ~1 mL (to match ANS hue) |

This composition was observed to be very stable, but to also have very slow kinetics during staining. As such, the staining was very light for staining under the normal operating conditions.

Example 3

A hematoxylin formulation having a $Cl^-/SO_4^{2-}$ molar ratio of 1/1 (i.e. 50% $Cl^-$) was made. In so formulating, the $SO_4^{2-}$ was included because its complete removal from ANS-Cl resulted in inferior stain quality (depth and hue of stain) and unacceptable kinetics (e.g. too slow for automated staining). Furthermore, the concentration of hematoxylin was also increased to increase kinetics, which were understood to be inhibited by the presence of the $Cl^-$.

| ANS-Cl-50 Hematoxylin Formulation (functional pH = 2.3) | |
|---|---|
| water | ~700 mL |
| ethylene glycol | 252.7 mL |
| hematoxylin | 9.09 g |
| sodium iodate | 0.98 g |
| $AlCl_3 \cdot 6H_2O$ | 10.21 g |
| $Al_2(SO_4)_3 \cdot 16H_2O$ | 26.67 g |

The formulation exhibited high quality staining and sufficient staining rates. After several experiments, it was concluded that higher concentrations of hematoxylin, in comparison to ANS, could be used to ensure that the kinetics of staining match the ANS benchmark. It was observed that the composition was sufficiently stable for extended periods of time without the inclusion of either the β-cyclodextrin or the hydroquinone as included in ANS. It was also observed that this formulation has a dramatically delayed onset of precipitation, which is understood to be the effect of the Cl$^-$ concentration.

Example 4

While the staining performance and kinetics of ANS-Cl-50 met or exceeded the benchmark performance of ANS, Example 4 was discovered to have further enhanced performance.

| NT-ANS-Cl-50 Hematoxylin Formulation (functional pH = 2.3) | |
| --- | --- |
| water | ~700 mL |
| propylene glycol | 252.7 mL |
| hematoxylin | 9.09 g |
| sodium iodate | 0.98 g |
| AlCl$_3$•6H$_2$O | 10.21 g |
| Al$_2$(SO$_4$)$_3$•16H$_2$O | 26.67 g |

This formulation exceeded the performance of ANS-Cl-50, in terms of stain quality, staining kinetics, and stability, but also included no ethylene glycol, which is a known hazardous substance. It was discovered that the non-toxic propylene glycol can substitute the ethylene glycol while synergistically improving stain quality and increasing the staining rate. Our experimental results established that a Cl$^-$/SO$_4^{2-}$ molar ratio greater than 1:1 would further enhance stability, but at the expense of slower staining kinetics. Since the enhancement to stability observed for this composition was sufficient, slower reaction kinetics could not be justified. However, such compositions would be valuable staining compositions provided additional time, temperature, or kinetics. Means of increasing the staining kinetics include adjust the pH higher, increasing reaction temperature, or increasing the concentration of the reaction mixture, amongst others.

Example 5

To establish the impact of the Cl$^-$/SO$_4^{2-}$ molar ratio, various other ratios were prepared in which AlCl$_3$.6H$_2$O and Al$_2$(SO$_4$)$_3$.16H$_2$O were used as the mordant. The pH was adjusted to match the ANS hue. All other components were the same as ANS (Example 1). For a 1:4 Cl$^-$/SO$_4^{2-}$ molar ratio (20% Cl$^-$), it was observed that equivalent staining characteristics could be obtained, when compared to ANS, but that the kinetics were substantially slower. Furthermore, the stability or onset of precipitation was observed to be inferior to ANS-Cl-50.

Example 6

For a 1:2 Cl$^-$/SO$_4^{2-}$ molar ratio (33% Cl$^-$), all components were included as described in Example 5. Furthermore, the concentrations of the components were increased by 25% over Example 5, in addition to the change in the molar ratio. It was observed that equivalent staining characteristics could be obtained, when compared to ANS, but that the kinetics were substantially slower. Furthermore, the stability or onset of precipitation was observed to be inferior to ANS-Cl-50.

Example 7

For a 1:2 Cl$^-$/SO$_4^{2-}$ molar ratio (33% Cl$^-$), all components were included as described in Example 6, except at a 50% increase in concentration over Example 5. It was observed that equivalent staining characteristics could be obtained, when compared to ANS, and that the kinetics were substantially equivalent to ANS.

Example 8

Example 8 illustrates a 1:7 Cl$^-$/SO$_4^{2-}$ molar ratio (12.5% Cl$^-$). Example 8 was discovered to have further enhanced performance.

| Additional Hematoxylin Formulation (functional pH = 2.3) | |
| --- | --- |
| water | ~700 mL |
| propylene glycol | 252.7 mL |
| hematoxylin | 6.06 g |
| sodium iodate | 0.65 g |
| AlCl$_3$•6H$_2$O | 1.42 g |
| Al$_2$(SO$_4$)$_3$•16H$_2$O | 37.23 g |
| gallic acid monohydrate | 5.33 g |

The formulation exceeded the performance of NT-ANS-Cl-50 in terms of stain quality, staining kinetics and stability and included no ethylene glycol. It was observed that equivalent staining characteristics could be obtained when compared to ANS and that the kinetics were substantially equivalent to ANS. The results obtained with the addition of gallic acid monohydrate corresponded to the results observed in experiments without gallic acid monohydrate (Example 4).

Example 9

Accelerated stability studies at 45° C. were carried out only for Example 7 and Example 3, which stained equivalently to ANS. It was observed that Example 7 formed precipitate as quickly as ANS, but Example 3 formed no precipitate over the 32 day study.

Example 10

The various compositions described herein were stored in closed containers at either room temperature or 45° C. or a period of time prior to use. Throughout the remaining examples, photomicrographs comparing the various compositions are provided to convey the stain quality and extent of precipitation.

FIG. 2(A-F) are photomicrographs of serial sections of 4 micron thick tissue sections taken at 10× magnification stained with (A) the hematoxylin solution of Example 1 as it was freshly prepared, (B) the hematoxylin solution of Example 4 as it was freshly prepared, (C) the hematoxylin solution of Example 1 having undergone accelerated aging (45° C., 32 days) as described in Example 9, and (D) the hematoxylin solution of Example 4 having undergone accelerated aging (45° C., 32 days) as described in Example 9; FIG. 2(E) and FIG. 2(F) are the same sections shown in FIG. 2(C) and FIG. 2(D), respectively shown with a closer perspective (e.g. digital zoom).

Functional staining with ANS Hematoxylin, stored at 45° C., revealed increasing amounts of precipitate began at ~7 days. No evidence of precipitate was detected after extended periods for the ANS-Cl Hematoxylin under the same conditions (in excess of 6 weeks).

The difference in precipitation was also observed for the hematoxylin packaging. FIGS. 3(A-B) are photographs showing the precipitation of hematoxylin solutions on surfaces in which they contact. FIG. 3(A) shows two bottles (polyethylene terephthalate glycol-modified) that had previously contained hematoxylin at 45° C. for 32 days after the bottles had been drained and rinsed with DI water, the left showing a bottle having contained the formulation as described in Example 1 and the right showing the bottle having contained the formulation of Example 4. FIG. 3(B) shows loops of tubing, like that kind which would be found in an autostainer, after containing solutions for 7 days at 60° C., the loops were drained and rinsed with DI water. The left tubing contained the formulation as described in Example 1 and the right contained the formulation as described in Example 4. In all cases, the ANS Hematoxylin solution produced visibly more precipitate coating on the inside of the tubing loops than any of the chloride-based hematoxylin solutions.

Figure 4A:
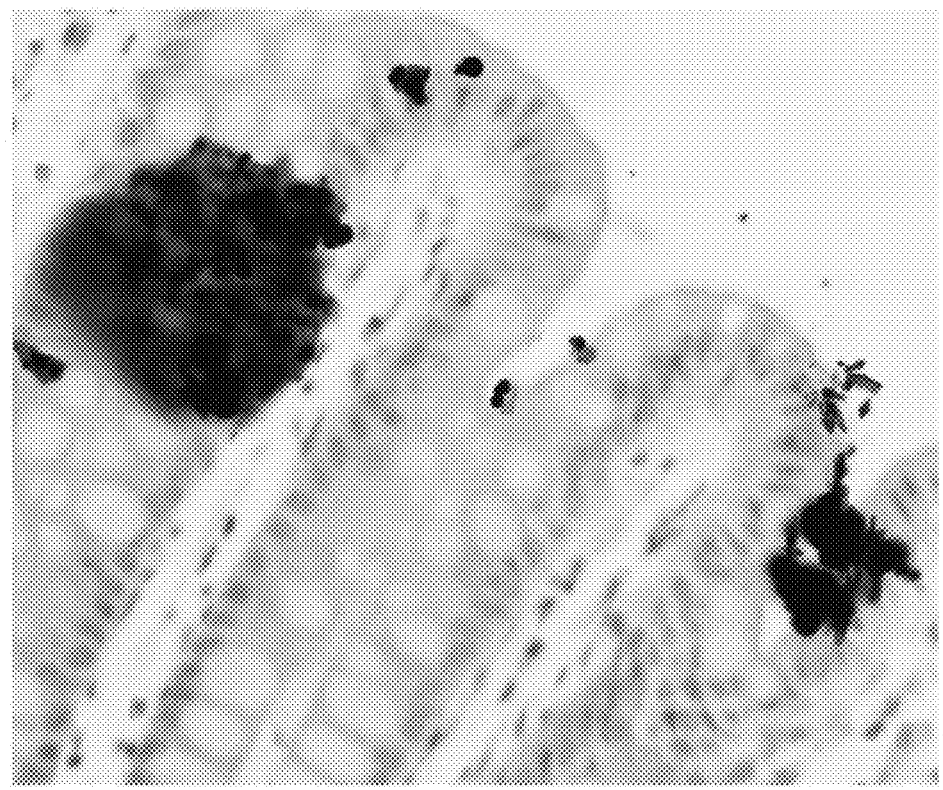
FIG. 4(A) is a photomicrograph of serial sections of 4 micron thick tissue sections stained with the hematoxylin solution of Example 1 having undergone accelerated aging (45° C., 32 days) as described in Example 9.
Figure 4B:
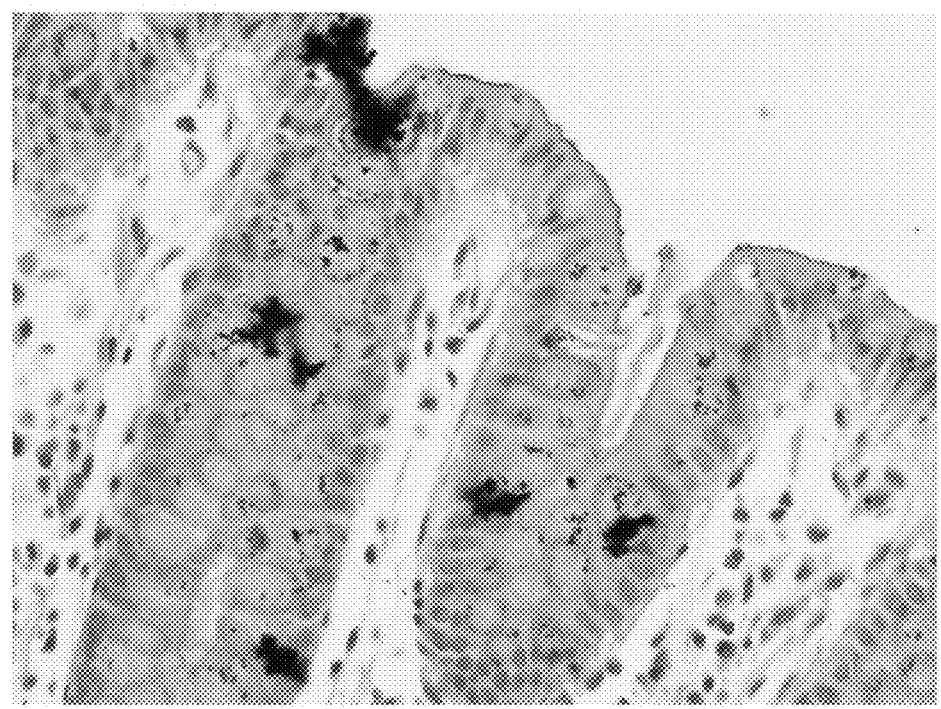
FIG. 4(B) is a photomicrograph of serial sections of 4 micron thick tissue sections stained with the hematoxylin solution of Example 4 having undergone accelerated aging (45° C., 32 days) as described in Example 9, wherefrom the difference between good staining performance and poor staining performance, as described herein, can be further described.

Referring now to FIGS. 4(A-B), shown are photomicrographs of serial sections of 4 micron thick tissue sections stained with (A) the hematoxylin solution of Example 1 having undergone accelerated aging (45° C., 32 days) as described in Example 10; and (B) the hematoxylin solution of Example 4 having undergone accelerated aging (45° C., 32 days) as described in Example 10. Referring to FIG. 4(A), the intensity of the nuclear stain seen is substantially lighter than that observed in FIG. 4(B). This makes the staining of FIG. 4(A) inferior to FIG. 4(B) as pathologist typically prefer darker nuclear staining intensity. Furthermore, the macroscopically observable hematoxylin precipitate (left upper portion of FIG. 4(A), is an undesirable attribute to observe on a hematoxylin stained sample. The precipitate can often obscure underlying tissue morphology thus leading to difficulty in making the diagnosis. In the sample shown in FIG. 4(B), while the hematoxylin precipitate is present, the size of the precipitate is substantially smaller and it obscures the underlying tissue morphology to a lesser degree. Furthermore, the intensity of the stain is still sufficiently dark to allow for an accurate diagnosis.

The invention claimed is:

1. A method for staining a biological sample, the method comprising:
    contacting a hematoxylin staining composition to the biological sample, wherein the hematoxylin staining composition comprises:
    (i) a solvent,
    (ii) hematoxylin,
    (iii) an amount of chemical oxidant sufficient to convert at least a portion of the hematoxylin to hematein,
    (iv) a mordant, and
    (v) chloride ($Cl^-$) and sulfate ($SO_4^{2-}$), wherein the chloride/sulfate molar ratio is between about 2.5/1 and about 1/4 and wherein,
    in the method of making the hematoxylin staining composition, the chemical oxidant is added before the mordant is added,
    wherein the biological sample is a tissue sample or a cytology sample, and
    wherein the mordant is an aluminum mordant.

2. The method of claim 1, wherein the mordant comprises $Al_2(SO_4)_3$, $Al_2(SO_4)_3 \cdot 16H_2O$, $AlM(SO_4)_2 \cdot 12(H_2O)$, $Al_2(SO_4)_3 \cdot 18H_2O$, or $[Al(H_2O)_6]_2(SO_4)_3 \cdot 5H_2O$, wherein M is a monovalent cation.

3. The method of claim 1, wherein the mordant comprises $AlCl_3$ or $AlCl_3 \cdot 6H_2O$.

4. The method of claim 1, wherein the mordant comprises $Al_2(SO_4)_3$, $Al_2(SO_4)_3 \cdot 16H_2O$, $AlM(SO_4)_2 \cdot 12(H_2O)$, $Al_2(SO_4)_3 \cdot 6H_2O$, $Al_2(SO_4)_3 \cdot 18H_2O$, $[Al(H_2O)_6]_2(SO_4)_3 \cdot 5H_2O$, $AlCl_3$ or $AlCl_3 \cdot 6H_2O$, wherein M is a monovalent cation.

5. The method of claim 1, wherein the chloride/sulfate molar ratio is between about 2/1 and about 1/2.

6. The method of claim 1, wherein the chloride/sulfate molar ratio is between about 1.5/1 and about 1/1.5.

7. The method of claim 1, wherein the chloride/sulfate molar ratio is about 1/1.

8. The method of claim 1, wherein the hematoxylin has a molar concentration of between about 0.01 M and about 0.05 M.

9. The method of claim 1, wherein the hematoxylin has a molar concentration of between about 0.02 M and about 0.04 M.

10. The method of claim 1, wherein the hematoxylin has a molar concentration of about 0.03 M.

11. The method of claim 1, wherein the chemical oxidant is sodium iodate.

12. The method of claim 11, wherein the sodium iodate has a molar concentration of between about 0.001 M and about 0.01 M.

13. The method of claim 11, wherein the sodium iodate has a molar concentration of between about 0.003 M and about 0.008 M.

14. The method of claim 11, wherein the sodium iodate has a molar concentration of about 0.005M.

15. The method of claim 1, wherein the composition further comprises aluminum, and wherein aluminum has a molar concentration of about 0.1M.

16. The method of claim 1, wherein the composition further comprises aluminum, and wherein aluminum has a molar concentration of greater than about 0.1M aluminum.

17. The method of claim 15, wherein the composition has an aluminum/hematoxylin molar ratio of between about 4/1 and about 1/1.

18. The method of claim 15, wherein the composition has an aluminum/hematoxylin molar ratio of between about 3/1 and about 1.5/1.

19. The method of claim 15, wherein the composition has an aluminum/hematoxylin molar ratio of about 2/1.

20. The method of claim 1, wherein the chloride has a molar concentration between about 0.01 M and about 0.1 M.

21. The method of claim 1, wherein the chloride has a molar concentration between about 0.02 M and about 0.08 M.

22. The method of claim 1, wherein the chloride has a molar concentration of about 0.04 M.

23. The method of claim 1, wherein the composition is substantially devoid of a polysaccharide, a cryptand, a cryptophane, a cavitand, a crown ether, a dendrimer, a nanotube, a calixarene, a valinomycin, or a nigericin.

24. The method of claim 1, wherein the composition is substantially devoid of an antioxidant.

25. The method of claim 1, wherein the contacting of the hematoxylin staining composition to the biological sample is performed with an autostainer.

26. The method of claim 25, further comprising contacting the sample with a counterstain.

27. The method of claim 26, wherein the counterstain is selected from the group consisting of eosin Y, orange G, light green SF yellowish, Bismark Brown, and fast green FCF.

28. The method of claim 25, wherein contacting the sample with the hematoxylin composition comprises a progressive hematoxylin staining protocol.

29. The method of claim 25, wherein contacting the sample with the hematoxylin composition comprises a regressive hematoxylin staining protocol.

30. The method of claim 25, wherein the biological sample is supported on a substrate.

31. The method of claim 30, wherein the substrate comprises a microscope slide.

32. The method of claim 25, wherein the method comprises a hematoxylin and eosin (H&E) staining method.

33. The method of claim 25, wherein the method comprises a Papanicolaou (PAP) staining method.

* * * * *